United States Patent
Li

(10) Patent No.: US 10,880,539 B2
(45) Date of Patent: Dec. 29, 2020

(54) METHOD FOR CONTROLLING STRUCTURED LIGHT PROJECTOR, DEPTH CAMERA AND ELECTRONIC DEVICE

(71) Applicant: GUANGDONG OPPO MOBILE TELECOMMUNICATIONS CORP., LTD., Guangdong (CN)

(72) Inventor: Xiaopeng Li, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/534,549

(22) Filed: Aug. 7, 2019

(65) Prior Publication Data

US 2020/0112713 A1 Apr. 9, 2020

(30) Foreign Application Priority Data

Oct. 9, 2018 (CN) .......................... 2018 1 1180890

(51) Int. Cl.
*G06T 7/521* (2017.01)
*H04N 13/254* (2018.01)
(Continued)

(52) U.S. Cl.
CPC .......... *H04N 13/254* (2018.05); *G06T 7/521* (2017.01); *H04N 5/2253* (2013.01);
(Continued)

(58) Field of Classification Search
CPC .............. H04N 13/254; H04N 13/296; H04N 5/23219; H04N 5/2253; H04N 5/2256;
(Continued)

(56) References Cited

U.S. PATENT DOCUMENTS 10,466,360 B1 * 11/2019 Bardagjy ............. H04N 5/2256
10,567,641 B1 * 2/2020 Rueckner ............. H04N 5/2257
(Continued)

FOREIGN PATENT DOCUMENTS

CN 103870824 A 6/2014
CN 104616438 A 5/2015
(Continued)

OTHER PUBLICATIONS

International Search Report in the international application No. PCT/CN2019/075380, dated Apr. 26, 2019.
(Continued)

*Primary Examiner* — Howard D Brown, Jr.
(74) *Attorney, Agent, or Firm* — Ladas & Parry LLP

(57) ABSTRACT

A method for controlling a structured light projector is provided. The method includes that: a depth image and an initial visible light image of a scene are acquired; whether a face exists in the initial visible light image is determined; responsive to determining that the face exists in the initial visible light image, a distance between the face and the structured light projector is calculated based on the initial visible light image and the depth image; and light emission power of the structured light projector is adjusted based on the distance. A depth camera and an electronic device are also provided.

20 Claims, 11 Drawing Sheets

(51) Int. Cl.
*H04N 13/296* (2018.01)
*H04N 5/232* (2006.01)
*H04N 5/225* (2006.01)

(52) U.S. Cl.
CPC ....... *H04N 5/23219* (2013.01); *H04N 13/296* (2018.05); *G06T 2207/10028* (2013.01); *G06T 2207/10152* (2013.01); *G06T 2207/30201* (2013.01)

(58) Field of Classification Search
CPC .. H04N 5/2354; H04N 5/2226; H04N 13/271; G06T 7/521; G06T 2207/30201; G06T 2207/10028; G06T 2207/10152
See application file for complete search history.

(56) References Cited

U.S. PATENT DOCUMENTS

| | | | | |
|---|---|---|---|---|
| 2010/0177929 | A1* | 7/2010 | Kurtz | H04N 9/3161 382/103 |
| 2018/0217234 | A1* | 8/2018 | Skowronek | G01S 17/89 |
| 2018/0227567 | A1* | 8/2018 | Chao | G01S 17/46 |
| 2019/0051005 | A1* | 2/2019 | Chang | H04N 13/268 |
| 2019/0142524 | A1* | 5/2019 | Hladio | A61B 90/361 600/249 |
| 2019/0302581 | A1* | 10/2019 | Zhao | H04N 5/74 |
| 2019/0377856 | A1* | 12/2019 | Zhang | G06F 21/32 |
| 2019/0379880 | A1* | 12/2019 | Zhang | H04N 13/254 |

FOREIGN PATENT DOCUMENTS

| | | |
|---|---|---|
| CN | 106331517 A | 1/2017 |
| CN | 107944422 A | 4/2018 |
| CN | 108281880 A | 7/2018 |
| CN | 108376251 A | 8/2018 |
| CN | 108376252 A | 8/2018 |
| CN | 108508620 A | 9/2018 |
| CN | 108509867 A | 9/2018 |
| CN | 108523819 A | 9/2018 |
| CN | 108564041 A | 9/2018 |
| CN | 108615012 A | 10/2018 |
| CN | 109194869 A | 1/2019 |

OTHER PUBLICATIONS

Written Opinion of the International Search Authority in the international application No. PCT/CN2019/076380, dated Apr. 28, 2019.
First Office Action of CN application No. 201811180890.3, dated May 22, 2019.
European Search Report in corresponding European application No. 19186238.2, dated Jan. 27, 2020.
Second Office Action in corresponding Chinese application No. 201811180890.3, dated Dec. 4, 2019.
Third Office Action of Chinese application No. 201811180890.3, dated May 20, 2020.
Notice of Rejection of the Chinese application No. 201811180890.3, dated Jul. 15, 2020.

* cited by examiner

METHOD FOR CONTROLLING STRUCTURED LIGHT PROJECTOR, DEPTH CAMERA AND ELECTRONIC DEVICE

CROSS-REFERENCE TO RELATED APPLICATIONS

The present application claims priority to Chinese Patent Application No. 201811180890.3, entitled "CONTROL METHOD, CONTROL APPARATUS, DEPTH CAMERA AND ELECTRONIC DEVICE", filed on Oct. 9, 2018, the disclosure of which is hereby incorporated by reference in its entirety.

TECHNICAL FIELD

The present disclosure relates to the technical field of three-dimensional imaging, and particularly to a method for controlling a structured light projector, a depth camera and an electronic device.

BACKGROUND

A structured light projector can project laser with predetermined pattern information. The structured light projector projects laser onto a target user in a space, then an image acquisition device acquires a laser pattern obtained by reflecting the laser pattern projected by the structured light projector with the target user, and finally the laser pattern acquired by the image acquisition device is further processed to obtain a depth image of the target user.

SUMMARY

The aspects of the present disclosure provide a method for controlling a structured light projector, a depth camera and an electronic device.

A first aspect of the disclosure provides a method for controlling a structured light projector, which includes that: a depth image and an initial visible light image of a scene are acquired; whether a face exists in the initial visible light image is determined; responsive to determining that the face exists in the initial visible light image, a distance between the face and the structured light projector is calculated based on the initial visible light image and the depth image; and light emission power of the structured light projector is adjusted based on the distance.

A second aspect of the disclosure provides a depth camera, which includes a structured light projector and a processor. The processor may be configured to acquire a depth image and an initial visible light image of a scene, determine whether a face exists in the initial visible light image, calculate, responsive to determining that the face exists in the initial visible light image, a distance between the face and the structured light projector based on the initial visible light image and the depth image, and adjust light emission power of the structured light projector based on the distance.

A third aspect of the disclosure provides an electronic device, which includes a shell and a depth camera. The depth camera may be arranged on the shell. The depth camera may include a structured light projector and a processor. The processor may be configured to acquire a depth image and an initial visible light image of a scene, determine whether a face exists in the initial visible light image, calculate, responsive to determining that the face exists in the initial visible light image, a distance between the face and the structured light projector based on the initial visible light image and the depth image, and adjust light emission power of the structured light projector based on the distance.

BRIEF DESCRIPTION OF DRAWINGS

The abovementioned and/or additional aspects and advantages of the present disclosure will become apparent and easy to understand from the descriptions made to the embodiments below in combination with the drawings.

DETAILED DESCRIPTION

Figure 1:
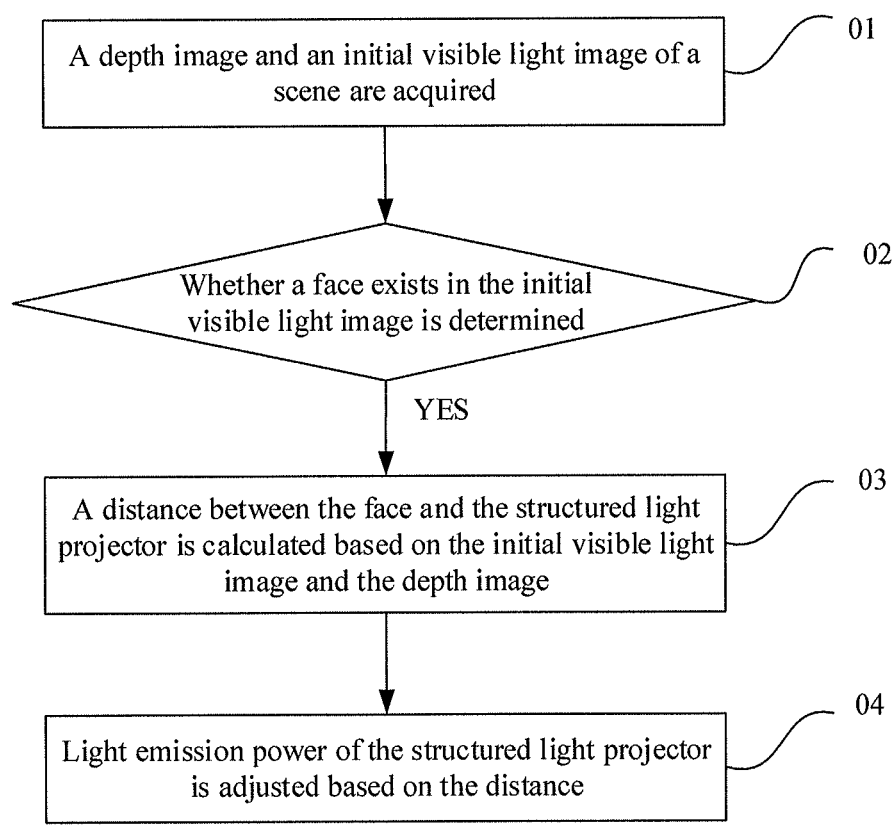
FIG. 1 illustrates a flowchart of a control method according to some embodiments of the present disclosure.

The embodiments of the present disclosure will be described below in detail. Examples of the embodiments are illustrated in the drawings and the same or similar reference signs always represent the same or similar components or components with the same or similar functions. The embodiments described below with reference to the drawings are exemplary and intended to explain the present disclosure and do not mean to improperly limit to the present disclosure.

In the related art, the laser emitted by the structured light projector is usually infrared laser, and thus, when the energy of the infrared laser is too high, it is easy to cause damage to eyes of the user.

Figure 3:
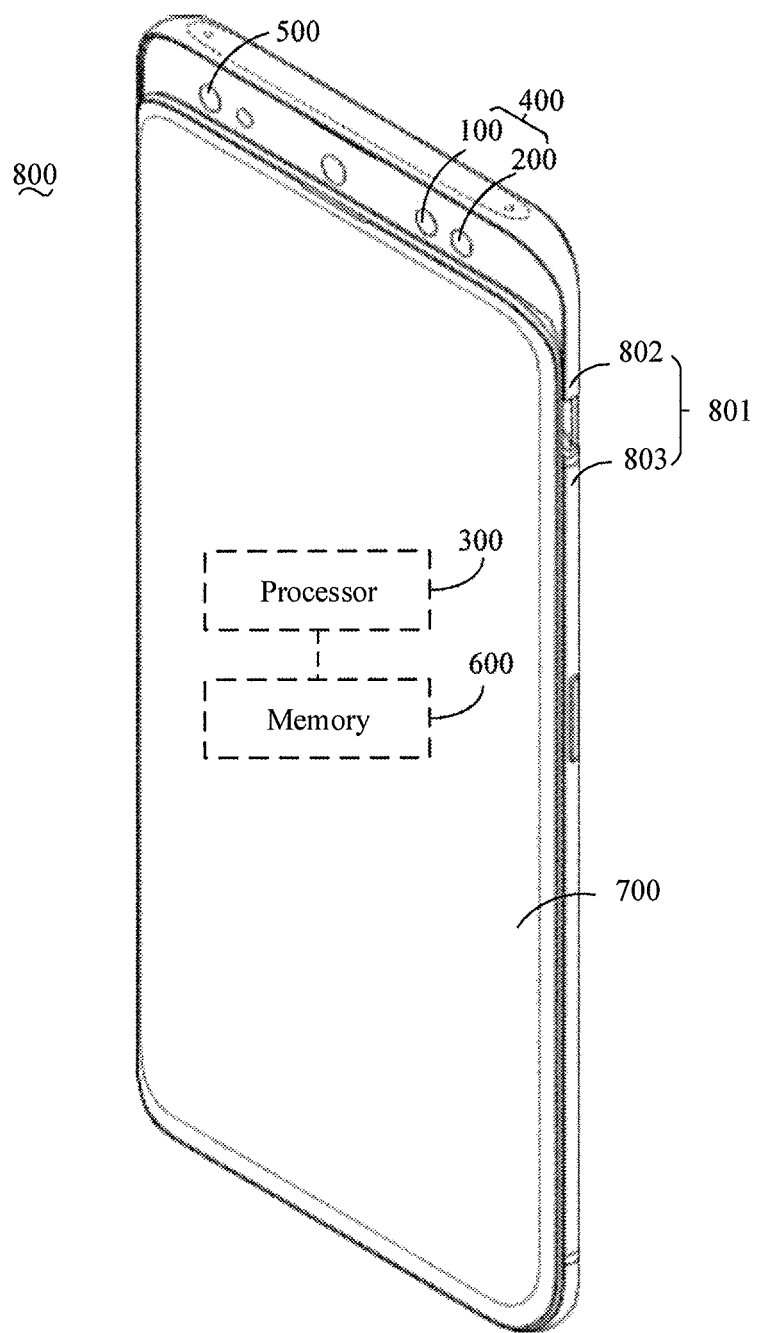
FIG. 3 and FIG. 4 illustrate structure diagrams of an electronic device according to some embodiments of the present disclosure.

As illustrated in FIG. 1 and FIG. 3, the present disclosure provides a method for controlling a structured light projector 100. The method includes the following operations illustrated in blocks of FIG. 1.

At block 01, a depth image and an initial visible light image of a scene are acquired.

At block 02, whether a face exists in the initial visible light image is determined.

At block 03, responsive to determining that the face exists in the initial visible light image, a distance between the face and the structured light projector 100 is calculated based on the initial visible light image and the depth image.

At block 04, light emission power of the structured light projector 100 is adjusted based on the distance.

Figure 2:
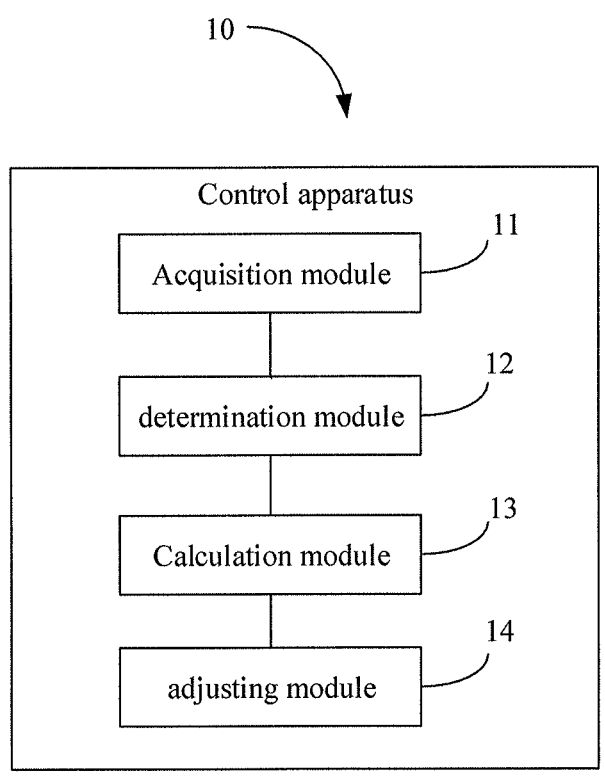
FIG. 2 illustrates a module schematic diagram of a control apparatus according to some embodiments of the present disclosure.

As illustrated in FIG. 2 and FIG. 3, the present disclosure also provides an apparatus 10 for controlling the structured light projector 100. The control method according to the embodiments of the present disclosure may be implemented by the control apparatus 10 of the embodiments of the present disclosure. As illustrated in FIG. 2, the control apparatus 10 includes an acquisition module 11, a determination module 12, a calculation module 13 and an adjusting module 14. Block 01 may be implemented by the acquisition module 11. Block 02 may be implemented by the determination module 12. Block 03 may be implemented by the calculation module 13. Block 04 may be implemented by the adjusting module 14.

That is, the acquisition module 11 may be configured to acquire the depth image and the initial visible light image of the scene. The determination module 12 may be configured to determine whether the face exists in the initial visible light image. The calculation module 13 may be configured to, respective to determining that the face exists in the initial visible light image, calculate a distance between the face and the structured light projector 100 based on the initial visible light image and the depth image. The adjusting module 14 may be configured to adjust the light emission power of the structured light projector 100 based on the distance.

As illustrated in FIG. 3, the present disclosure also provides a depth camera 400. The depth camera 400 includes the structured light projector 100, a structured light camera 200 and a processor 300. All of block 01, block 02, block 03 and block 04 may be implemented by the processor 300. That is, the processor 300 may be configured to acquire the depth image and an initial visible light image of a scene, determine whether the face exists in the initial visible light image, calculate, responsive to determining that the face exists in the initial visible light image, the distance between the face and the structured light projector 100 based on the initial visible light image and the depth image, and adjust the light emission power of the structured light projector 100 based on the distance.

Figure 4:
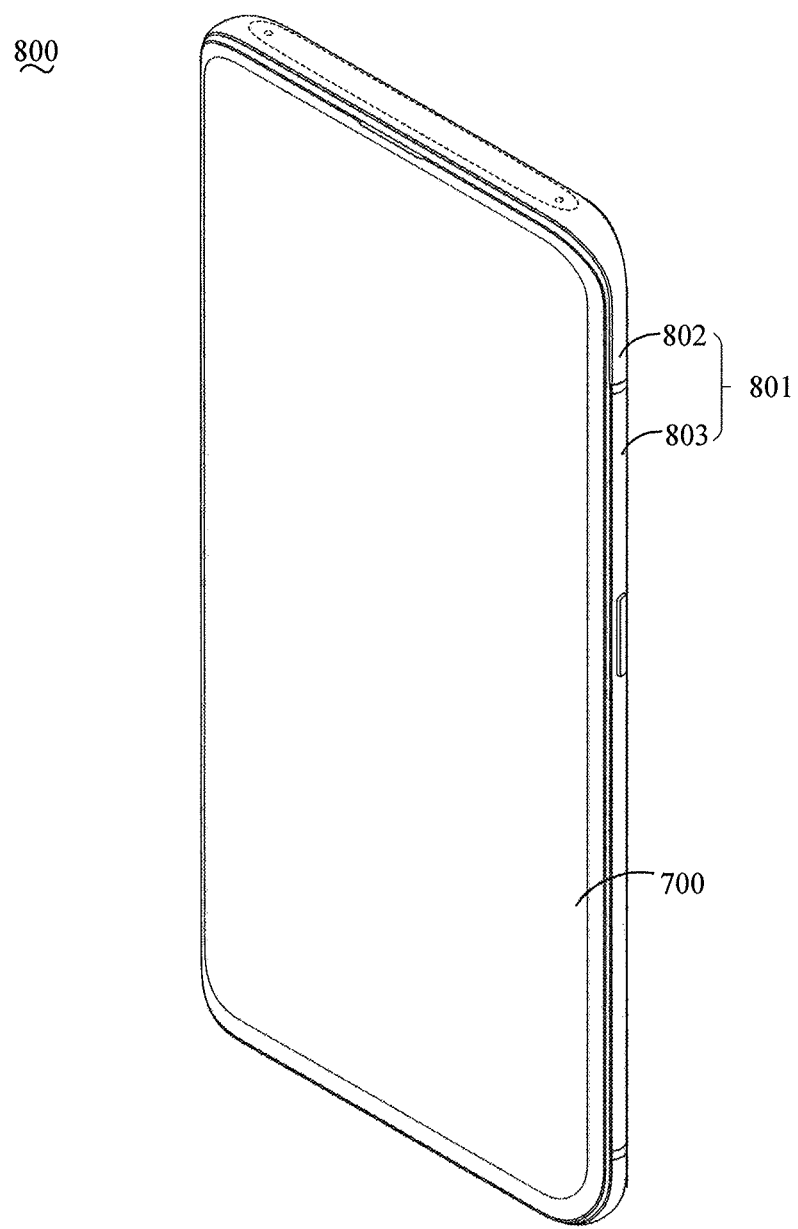

As illustrated in FIG. 3 and FIG. 4, the present disclosure also provides an electronic device 800. The electronic device 800 includes a shell 801 and the depth camera 400. The depth camera 400 is arranged on the shell 801. The processor 300 of the depth camera 400 may be an independent processor 300 integrated in the depth camera 400. Or, the depth camera 400 may also share a processor with the electronic device 800, and in such case, the processor is independent of the depth camera 400 and integrated in the electronic device 800. In a specific embodiment of the present disclosure, the depth camera 400 shares a processor with the electronic device 800. Herein, the electronic device 800 may be a mobile phone, a tablet computer, a game console, a smart watch, a smart band, a head-mounted display device, an unmanned aerial vehicle and the like. Descriptions are made in the embodiments of the present disclosure with the condition that the electronic device 800 is a mobile phone as an example. It can be understood that a specific form of the electronic device 800 is not limited to a mobile phone.

The shell 801 is a carrier on which functional components of the electronic device are mounted. The shell 801 may provide protection such as dust prevention, drop prevention and waterproofing for the functional components. The functional components may include a display screen 700, a visible light camera 500, a receiver and the like. In the embodiments of the present disclosure, the shell 801 includes a main body 803 and a movable bracket 802. The movable bracket 802 may be driven by a driving device to move relative to the main body 803. For example, the movable bracket 802 may slide relative to the main body 803 to slide into the main body 803 (as shown in FIG. 4) or slide out of the main body 803 (as shown in FIG. 3). Part of functional components (for example, the display screen 700) may be mounted on the main body 803. Another part of functional components (for example, the depth camera 400, the visible light camera 500 and the receiver) may be mounted on the movable bracket 802. The movable bracket 802 may move to drive the another part of functional components to retract into the main body 803 or extend out of the main body 803. Of course, FIG. 3 and FIG. 4 only illustrate examples of specific forms of the shell 801 and should not be understood as limits to the shell 801 of the present disclosure.

The depth camera 400 is mounted on the shell 801. Specifically, an acquisition window may be formed in the shell 801, and the depth camera 400 is aligned with the acquisition window to enable the depth camera 400 to acquire depth information. In a specific embodiment of the present disclosure, the depth camera 400 is mounted on the movable bracket 802. When a user is required to use the depth camera 400, the movable bracket 802 may be triggered to slide out of the main body 803 to drive the depth camera 400 to extend out of the main body 803. When the depth camera 400 is not required to be used, the movable bracket 802 may be triggered to slide into the main body 803 to drive the depth camera 400 to retract into the main body 803.

In the method for controlling the structured light projector 100 according to the embodiments of the present disclosure, the depth image may be captured by the depth camera 400, and the initial visible light image may be captured by the visible light camera 500 (for example, a Red, Green and Blue (RGB) camera). The depth image indicates the depth information of each object in the scene, and the visible light image indicates color information of each object in the scene.

The processor 300, after controlling the depth camera 400 to capture the depth image and controlling the visible light camera 500 to capture the initial visible light image, further recognizes whether the face exists in the initial visible light image according to a face recognition algorithm. For example, the processor 300 may recognize whether the face exists in the initial visible light image by use of a Haar feature or a Local Binary Pattern (LBP) feature.

Specifically, the Haar feature is a rectangular feature including a white region and a black region, and may reflect a gray-scale change condition of the image. The Haar feature includes multiple rectangular feature templates, and sizes and positions of the rectangular feature templates may be changed to exhaust numerous rectangular features in a child window of the image. In a face detection process, a frame of the initial visible light image is divided into multiple child windows at first, and proper rectangular features are searched to describe each child window, thereby representing feature information of each child window by use of the rectangular features. Herein, there are multiple rectangular features configured to describe the child window. After the feature information of each child window is described by use of multiple rectangular features, a pre-trained face classifier is adopted to detect each child window according to the rectangular features corresponding to each child window to determine whether the child window is in a face region part. Finally, the child window determined to belong to the face region part is classified to obtain a face region in the initial visible light image. In such a manner, if all child windows in the initial visible light image are classified into a non-face region part by the trained face classifier, the face region may not be acquired in the initial visible light image, and thus it is indicated that the face does not exist in the initial visible light image.

The LBP feature is an operator configured to describe a local texture feature of the image, and has remarkable advantages of rotational invariance and gray-scale invariance. The LBP feature is defined as follows: in a size adjustable window, a center pixel of the window is taken as a threshold, gray-scale values of multiple adjacent pixels are compared with a gray-scale value of the center pixel; if the gray-scale value of a surrounding pixel is larger than the gray-scale value of the center pixel, a position corresponding to the pixel is marked to be 1 and on the contrary, if the gray-scale value of a surrounding pixel is less than or equal to the gray-scale value of the center pixel, a position corresponding to the pixel is marked to be 0. In such a manner, an LBP value of the center pixel of each window may be adopted to reflect texture information of a region where the window is located. In a face recognition process, an LBP value of each pixel in the initial visible light image is calculated at first. Since each pixel corresponds to a window when serving as a center pixel, a statistical histogram of an LBP value corresponding to each window is calculated immediately when the LBP value of each pixel is calculated. Then, the statistical histograms of multiple windows are connected into a feature vector to obtain an LBP texture feature vector of the initial visible light image. Finally, whether the face exists in the initial visible light image may be determined by use of a support vector machine (SVM) according to the LBP texture feature vector of the initial visible light image.

When the depth camera 400 is a front camera or a rear camera, if the face exists in the initial visible light image, the processor 300 calculates the distance between the face and the structured light projector 100 based on the initial visible light image and the depth image and adjusts the light emission power of the structured light projector 100 based on the distance, thereby solving the problem that eyes of the user are harmed by excessively high light emission power of the structured light projector 100.

When the depth camera 400 is the front camera, if the face does not exist in the initial visible light image, it is considered that the depth camera 400 is in an out-of-service state. In such case, the processor 300 turns off the depth camera 400 to reduce power consumption of the electronic device 800.

According to the control method of the embodiments of the present disclosure, the light emission power of the depth camera 400 may be adjusted according to whether the face exists in the initial visible light image or not. When the face exists in the initial visible light image, the light emission power of the structured light projector 100 is adjusted based on the distance between the face and the structured light projector 100, thereby solving the problem that the eyes of the user are harmed by excessively high light emission power of the structured light projector 100 and improving safety in use of the electronic device 800.

Figure 5:
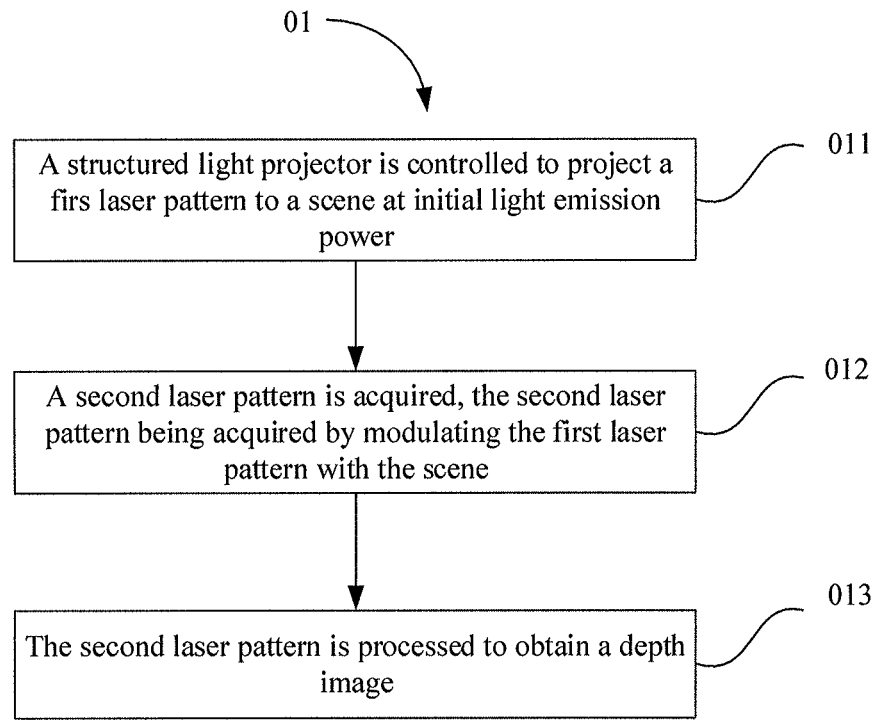
FIG. 5 illustrates a flowchart of a control method according to some embodiments of the present disclosure.

As illustrated in FIG. 3 and FIG. 5, in some embodiments, the operation 01 that the depth image and the initial visible light image of the scene are acquired includes the following actions illustrated in blocks of FIG. 5.

At block 011, the structured light projector 100 is controlled to project a first laser pattern to the scene at initial light emission power.

At block 012, a second laser pattern is acquired; herein the second laser pattern is acquired by modulating the first laser pattern with the scene.

At block 013, the second laser pattern is processed to obtain the depth image.

Figure 6:
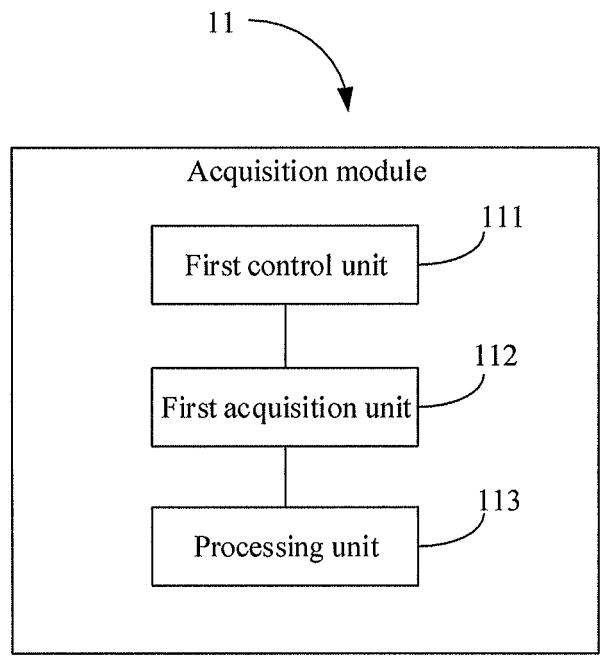
FIG. 6 illustrates a schematic diagram of an acquisition module of a control apparatus according to some embodiments of the present disclosure.

As illustrated in FIG. 3 and FIG. 6, in some embodiments, the acquisition module 11 includes a first control unit 111, a first acquisition unit 112 and a processing unit 113. Block 011 may be implemented by the first control unit 111. Block 012 may be implemented by the first acquisition unit 112. Block 013 may be implemented by the processing unit 113. That is, the first control unit 111 may be configured to control the structured light projector 100 to project the first laser pattern to the scene at the initial light emission power. The first acquisition unit 112 may be configured to acquire a second laser pattern; herein, the second laser pattern is acquired by modulating the first laser pattern with the scene. The processing unit 113 may be configured to process the second laser pattern to obtain the depth image.

As illustrated in FIG. 3, in some embodiments, all of block 011, block 012 and block 013 may be implemented by the processor 300. That is, the processor 300 may further be configured to control the structured light projector 100 to project a first laser pattern to the scene at the initial light emission power; acquire a second laser pattern, herein the second laser pattern is acquired by modulating the first laser pattern with the scene; and process the second laser pattern to obtain the depth image.

Herein, the initial light emission power may be obtained by calibration with multiple preliminary experiments, and is stored in a memory 600 of the electronic device 800. When the structured light projector 100 emits structured light at the initial light emission power, no matter how short a distance between the user and the structured light projector 100 is, the eyes of the user may be prevented from being harmed by energy of laser.

After the structured light projector 100 is turned on, the laser pattern with multiple speckles may be projected to the scene. Since each object in the scene is at a different distance far away from the structured light projector 100, the laser pattern projected onto the objects may be modulated because of different surface heights of the objects, and the speckles in the laser pattern may be offset. The structured light camera 200 acquires the laser pattern of which the speckles are shifted, i.e., the laser pattern modulated by the object. A reference pattern is stored in the memory 600, and the processor 300 may calculate depth data of multiple pixels based on offsets of the speckles in the laser pattern relative to speckles in the reference pattern. Multiple pixels with depth data may form a depth image.

According to the control method of the embodiments of the present disclosure, the depth data of the object in the scene may be measured by use of the depth camera 400 to form the depth image. Moreover, the structured light projector 100 projects the laser pattern at a relatively low initial light emission power, so that the eyes of the user are prevented from being harmed, and the user may use the electronic device 800 safely.

Figure 7:
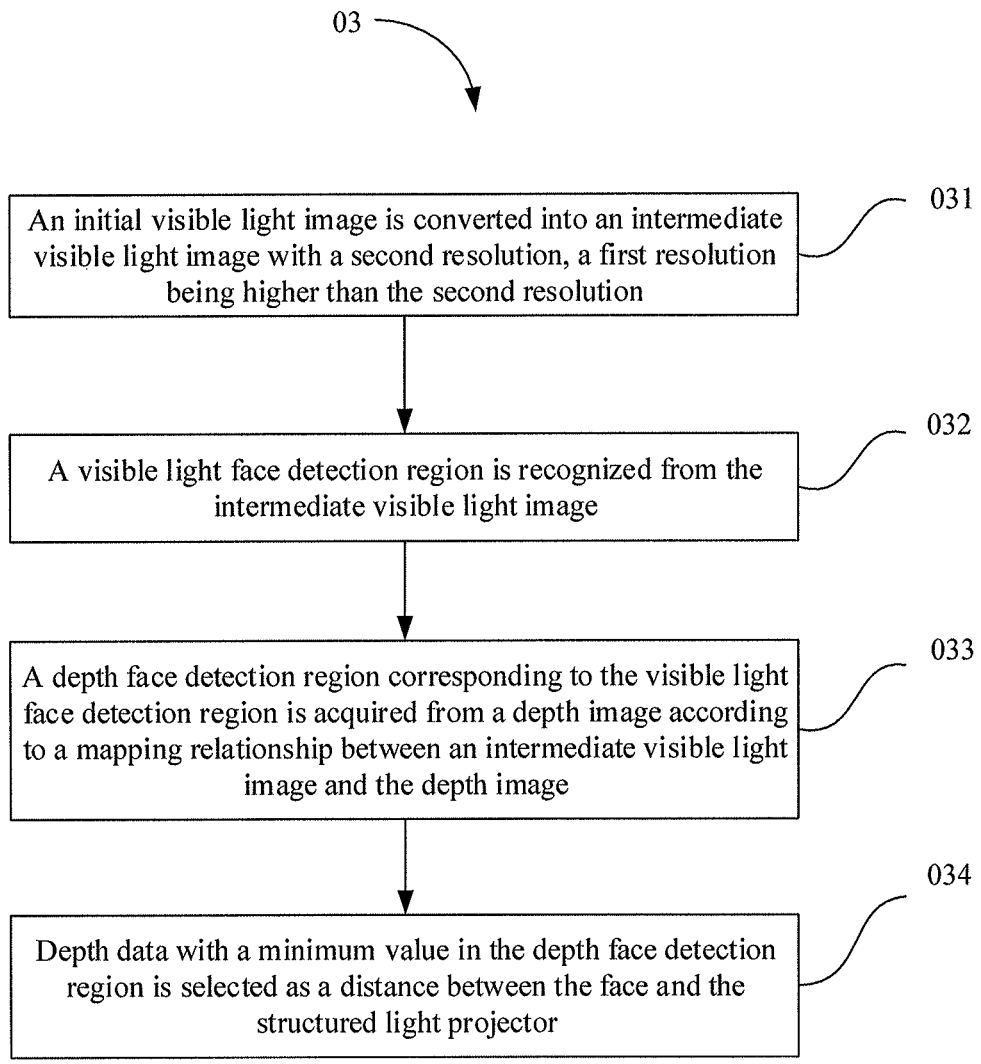
FIG. 7 illustrates a flowchart of a control method according to some embodiments of the present disclosure.
Figure 8:
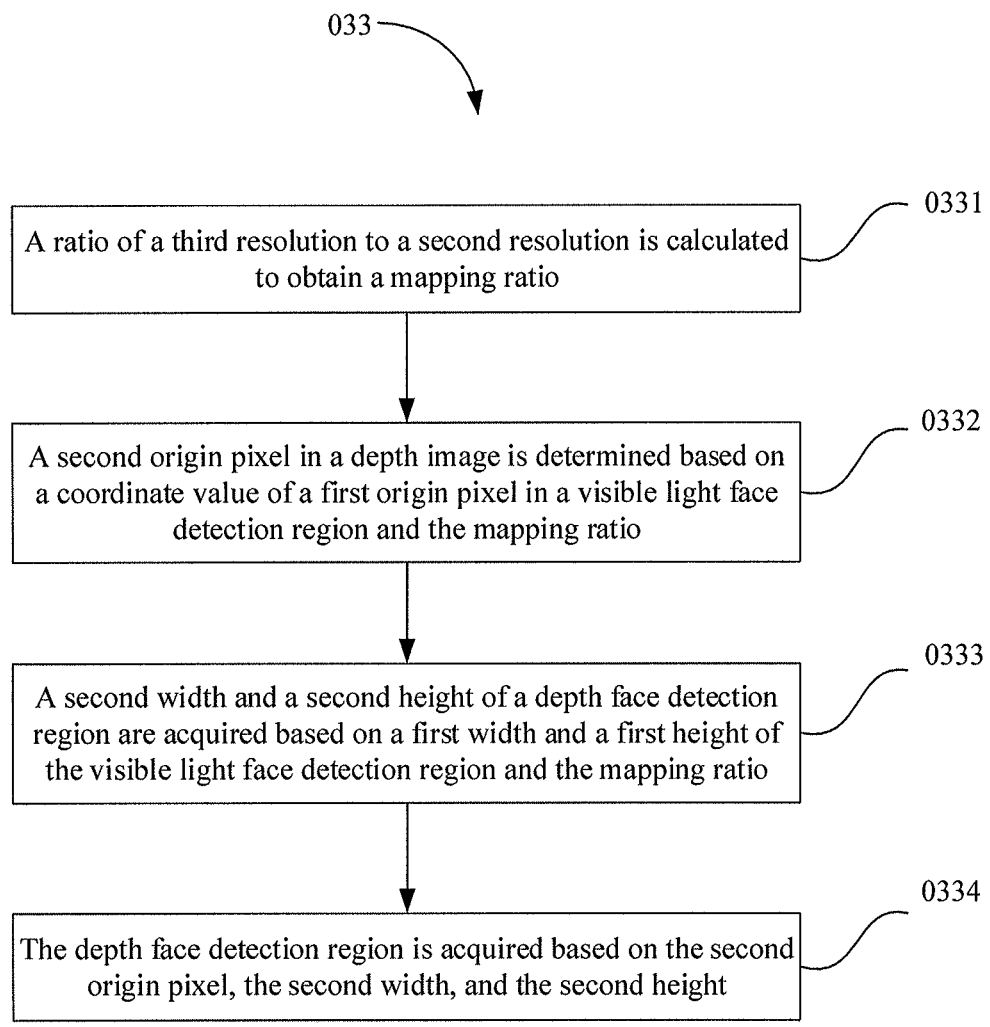
FIG. 8 illustrates a flowchart of a control method according to some embodiments of the present disclosure.

As illustrated in FIG. 3, FIG. 7 and FIG. 8, in some embodiments, the initial visible light image has a first resolution, and the depth image has a third resolution. The block 03 that the distance between the face and the structured light projector 100 is calculated based on the initial visible light image and the depth image responsive to that the face exists in the initial visible light image includes the following actions illustrated in blocks of FIG. 7.

At block 031, the initial visible light image is converted into an intermediate visible light image with a second resolution. Herein, the first resolution is higher than the second resolution.

At block 032, a visible light face detection region in the intermediate visible light image is recognized.

At block 033, a depth face detection region corresponding to the visible light face detection region is acquired from the depth image according to a mapping relationship between an intermediate visible light image and a depth image.

At block 034, depth data with a minimum value in the depth face detection region is selected as the distance between the face and the structured light projector 100.

Herein, block 033 further includes the following actions illustrated in blocks of FIG. 8.

At block 0331, a ratio of the third resolution to the second resolution is calculated to obtain a mapping ratio.

At block 0332, a second origin pixel in the depth image is determined based on a coordinate value of a first origin pixel in the visible light face detection region and the mapping ratio.

At block 0333, a second width and second height of the depth face detection region are acquired based on a first width and first height of the visible light face detection region and the mapping ratio.

At block 0334, the depth face detection region is acquired based on the second origin pixel, the second width and the second height.

Figure 9:
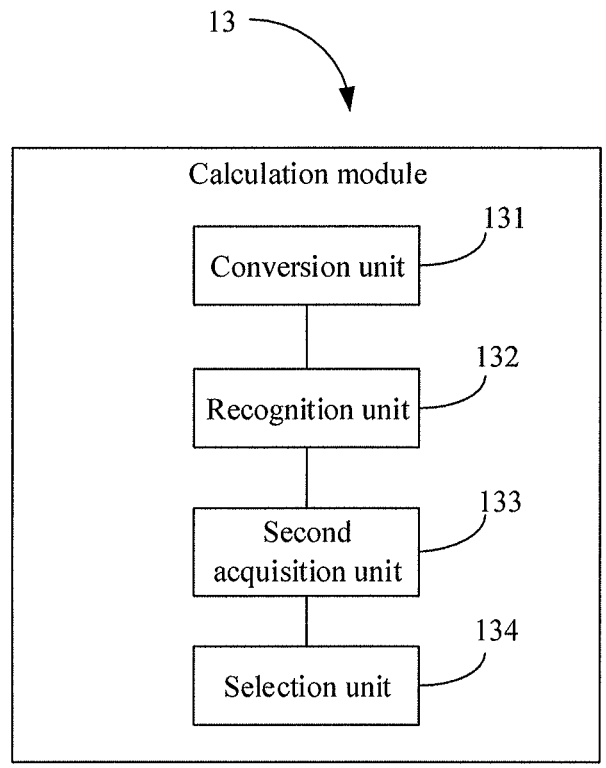
FIG. 9 illustrates a module schematic diagram of a calculation module of a control apparatus according to some embodiments of the present disclosure.
Figure 10:
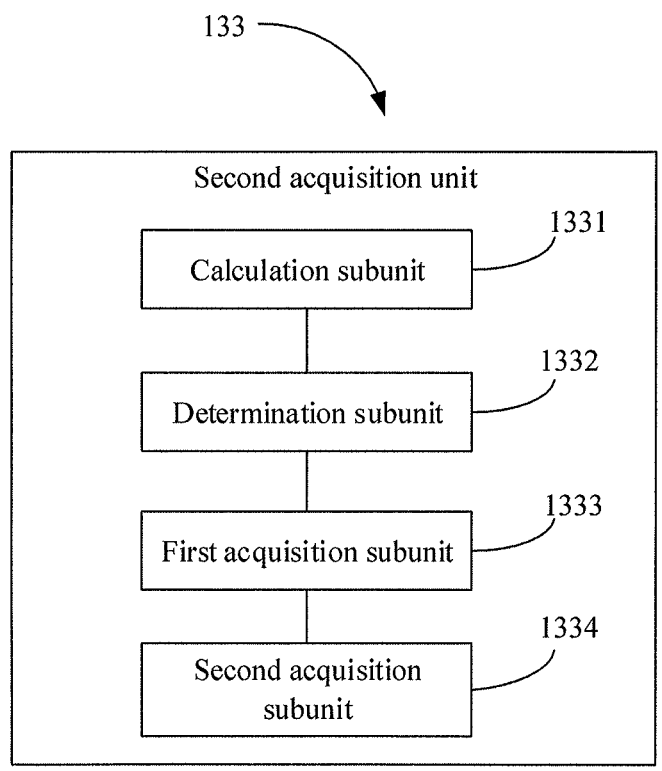
FIG. 10 illustrates a module schematic diagram of a second acquisition unit of a control apparatus according to some embodiments of the present disclosure.

As illustrated in FIG. 3, FIG. 9 and FIG. 10, in some embodiments, the calculation module 13 includes a conversion unit 131, a recognition unit 132, a second acquisition unit 133 and a selection unit 134. The second acquisition unit 133 includes a calculation subunit 1331, a determination subunit 1332, a first acquisition subunit 1333 and a second acquisition subunit 1334. Block 031 may be implemented by the conversion unit 131. Block 032 may be implemented by the recognition unit 132. Block 033 may be implemented by the second acquisition unit 133. Block 034 may be implemented by the selection unit 134. Block 0331 may be implemented by the calculation subunit 1331. Block 0332 may be implemented by the determination subunit 1332. Block 0333 may be implemented by the first acquisition subunit 1333. Block 0334 may be implemented by the second acquisition subunit 1334.

That is, the conversion unit 131 may be configured to convert the initial visible light image into the intermediate visible light image with the second resolution; herein, the first resolution is higher than the second resolution. The recognition unit 132 may be configured to recognize the visible light face detection region in the intermediate visible light image. The second acquisition unit 133 may be configured to acquire, from the depth image, the depth face detection region corresponding to the visible light face detection region according to the mapping relationship between the intermediate visible light image and the depth image. The selection unit 134 may be configured to select the depth data with the minimum value in the depth face detection region as the distance between the face and the structured light projector 100. The calculation subunit 1331 may be configured to calculate the ratio of the third resolution to the second resolution to obtain the mapping ratio. The determination subunit 1332 may be configured to determine the second origin pixel in the depth image based on the coordinate value of the first origin pixel in the visible light face detection region and the mapping ratio. The first acquisition subunit 1333 may be configured to acquire the second width and second height of the depth face detection region based on the first width and first height of the visible light face detection region and the mapping ratio. The second acquisition subunit 1334 may be configured to acquire the depth face detection region based on the second origin pixel, the second width and the second height.

As illustrated in FIG. 3, in some embodiments, all of block 031, block 032, block 033, block 0331, block 0332, block 0333, block 0334 and block 034 may be implemented by the processor 300. That is, the processor 300 may be configured to convert the initial visible light image into the intermediate visible light image with the second resolution, recognize the visible light face detection region in the intermediate visible light image, acquire from the depth image, the depth face detection region corresponding to the visible light face detection region according to the mapping relationship between the intermediate visible light image and the depth image and select the depth data with the minimum value in the depth face detection region as the distance between the face and the structured light projector 100. The processor 300, when executing block 033, specifically executes the actions of calculating the ratio of the third resolution to the second resolution to obtain the mapping ratio, determining the second origin pixel in the depth image based on the coordinate value of the first origin pixel in the visible light face detection region and the mapping ratio, acquiring the second width and second height of the depth face detection region based on the first width and first height of the visible light face detection region and the mapping ratio and acquiring the depth face detection region based on the second origin pixel, the second width and the second height.

Specifically, the first resolution refers to an initial resolution after the initial visible light image is captured. In general, the first resolution of the initial visible light image is relatively high. The third resolution of the depth image is usually lower than the first resolution of the initial visible light image. For finding the depth data of the face in the depth image and reducing the amount of data required to be processed by the processor 300, the processor 300 is required to perform compressive conversion on the initial visible light image with the first resolution to obtain the intermediate visible light image with the second resolution at first, for example, compressing the initial visible light image with the first resolution into the intermediate visible light image with the second resolution of 640×480. Then, the processor 300 recognizes the visible light face detection region from the intermediate visible light image. The face region recognized by the processor 300 usually refers to a region including parts such as a forehead, eyebrows, eyes, cheeks, ears, a nose, a mouth and a jaw. The processor 300, after recognizing the face region, is required to clip the face region to obtain the visible light face detection region. Specifically, the processor 300 further recognizes the eyebrows and the jaw from the face region and clip the visible light face detection region in a manner of bounding by the eyebrows and the jaw. Herein, the visible light face detection region may be a rectangle, a square, a round and the like, and is not limited herein. In a specific embodiment of the present disclosure, the visible light face detection region is a rectangle. The processor 300 determines a pixel in the top left corner of the visible light face detection region as the first origin pixel. A coordinate of the first origin pixel is marked as (left, top). A value of (left, top) corresponds to a pixel coordinate value of the first origin pixel in a pixel coordinate system of the initial visible light image. The processor 300 determines a pixel coordinate value (right, bottom) of a bottom right pixel in the initial visible light pixel and calculates a first width (represented as width) and a first height (represented as height) of the visible light face detection region based on the coordinate (left, top) and the coordinate (right, bottom). Finally, the processor 300 defines a position and a size of the visible light face detection region in the intermediate visible light image by use of (left, top, width, height).

Then, the processor 300 may determines, from the depth image, the depth face detection region corresponding to the visible light face detection region based on the visible light face detection region. For example, the third resolution of the depth image is 640×400. The processor 300 is required to calculate a mapping ratio of the visible light face detection region to the depth face detection region at first. Herein, the mapping ratio=the third resolution/the second resolution=
(640×400)/(640×480)=400/480=5/6. Then, the processor 300 calculates a coordinate value (left', top') of the top left pixel (i.e., the second origin pixel) in the depth face detection region in the depth image based on the mapping ratio and the coordinate value (left, top) of the first origin pixel. Herein, left'=(left×5)/6, and top'=(top×5)/6. Then, the processor 300 may determine a position of the second origin pixel based on the coordinate value (left', top'). Next, the processor 300 calculates a second width (represented as width') of the depth face detection region based on the first width of the visible light face detection region and the mapping ratio, namely width'=(width×5)/6, and calculates a second height (represented by height') of the depth face detection region based on the first height (height) of the visible light face detection region and the mapping ratio, namely height'=(height×5)/6. Then, the processor 300 may determine a position and a size of the depth face detection region in the depth image by use of (left', top', width', height').

Finally, the processor 300 selects the depth data with the minimum value from multiple pieces of depth data of the depth face detection region as the distance between the face and the structured light projector 100. The minimum depth data refers to a distance between a point closest to the structured light projector 100 in the face and the structured light projector 100. Compared with adjusting the light emission power of the structured light projector 100 by selecting a mid-value or mean value of the depth data, adjusting the light emission power of the structured light projector 100 on the basis of the minimum value may further prevent excessively high energy of the projected laser and improve safety of the eyes of the user.

According to the control method of the embodiments of the present disclosure, on one hand, the amount of the data required to be processed by the processor 300 may be reduced by compressing the resolution, and on the other hand, the depth face detection region corresponding to the visible light face detection region may be determined from the depth image according to a ratio relationship between the second resolution and the third resolution, thereby obtaining the depth data of the face. In such a manner, the distance between the face and the structured light projector 100 may be acquired to facilitate subsequent adjustment of the light emission power of the structured light projector 100.

Figure 11:
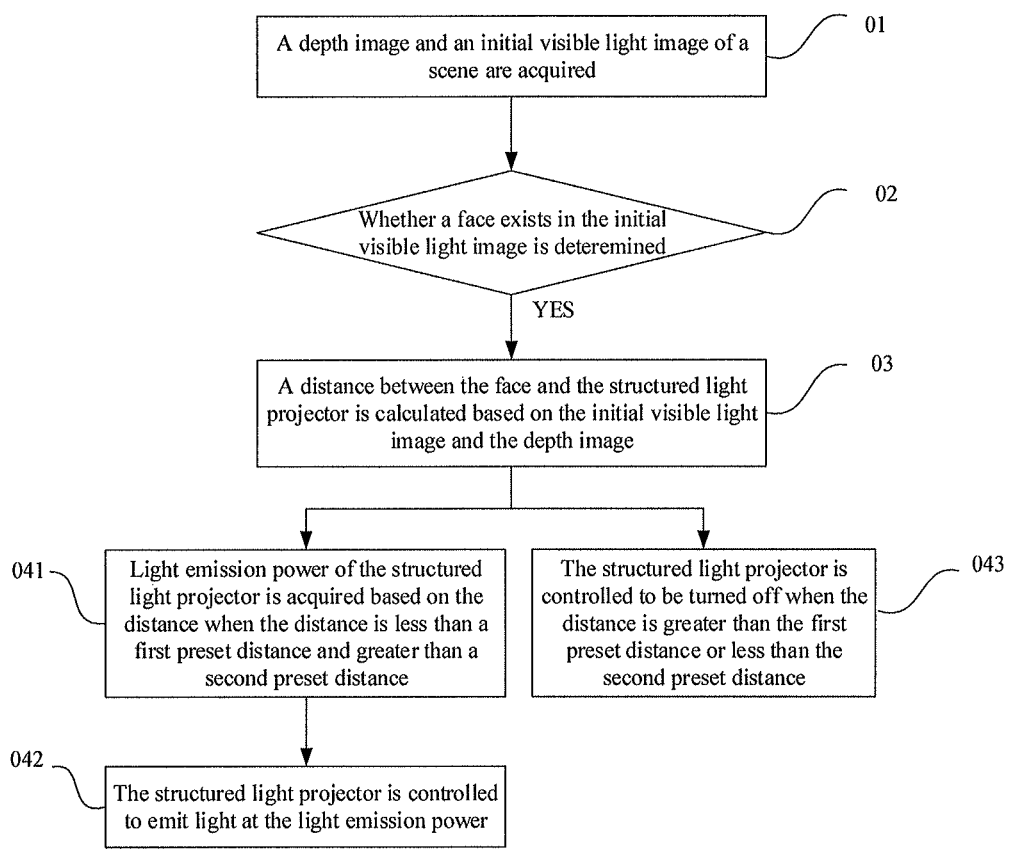
FIG. 11 illustrates a flowchart of a control method according to some embodiments of the present disclosure.

As illustrated in FIG. 3 and FIG. 11, in some embodiments, the block 04 that the light emission power of the structured light projector 100 is adjusted based on the distance includes the following actions illustrated in blocks of FIG. 11.

At block 041, the light emission power of the structured light projector 100 is acquired based on the distance when the distance is less than a first preset distance and greater than a second preset distance. Herein, the second preset distance is less than the first preset distance.

At block 042, the structured light projector 100 is controlled to emit light at the light emission power.

At block 043, the structured light projector 100 is controlled to be turned off when the distance is greater than the first preset distance or less than the second preset distance.

Figure 12:
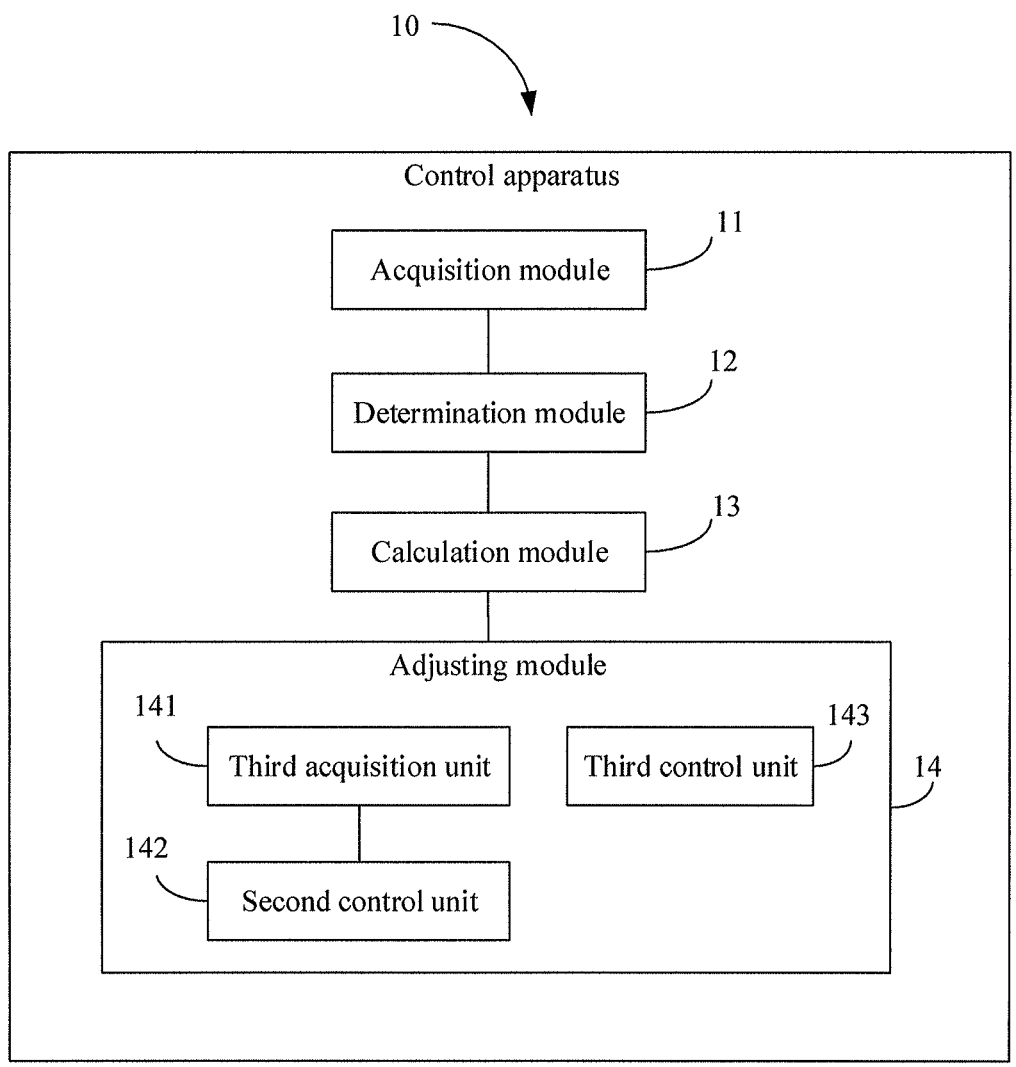
FIG. 12 illustrates a module schematic diagram of a control apparatus according to some embodiments of the present disclosure.

As illustrated in FIG. 3 and FIG. 12, in some embodiments, the adjusting module 14 includes a third acquisition unit 141, a second control unit 142 and a third control unit 143. Block 041 may be implemented by the third acquisition unit 141. Block 042 may be implemented by the second control unit 142. Block 043 may be implemented by the third control unit 143. That is, the third acquisition unit 141 may be configured to acquire the light emission power of the structured light projector 100 based on the distance when the distance is less than the first preset distance and greater than the second preset distance. Herein, the second preset distance is less than the first preset distance. The second control unit 142 may be configured to control the structured light projector 100 to emit the light at the light emission power. The third control unit 143 may be configured to control the structured light projector 100 to be turned off when the distance is greater than the first preset distance or less than the second preset distance.

As illustrated in FIG. 3, in some embodiments, all of block 041, block 042 and block 043 may be implemented by the processor 300. That is, the processor 300 may further be configured to acquire the light emission power of the structured light projector 100 based on the distance when the distance is less than the first preset distance and greater than the second preset distance, control the structured light projector 100 to emit the light at the light emission power, and control the structured light projector 100 to be turned off when the distance is greater than the first preset distance or less than the second preset distance. Herein, the second preset distance is less than the first preset distance.

Specifically, when the distance between the face and the structured light projector 100 is less than the second preset distance (for example, 2 centimeters, 3.5 centimeters, 4 centimeters and 5 centimeters), it is considered that the distance between the user and the structured light projector 100 is too short, and thus the processor 300 may directly turn off the structured light projector 100 to reduce the harms of laser to the eyes. In addition, when the distance between the face and the structured light projector 100 is less than the second preset distance, the depth camera 400 may usually not acquire complete depth data of the face of the user. In such case, the structured light projector 100 may also be directly turned off to reduce the power consumption of the electronic device 800.

When the distance between the face and the structured light projector 100 is greater than the second preset distance and less than the first preset distance (for example, 50 centimeters, 53 centimeters, 55.9 centimeters, 58 centimeters and 100 centimeters), the processor 300 adjusts a driving current of the structured light projector 100 based on the distance between the face and the structured light projector 100 to enable the structured light projector 100 to emit the light at target light emission power, thereby meeting a requirement on depth data acquisition accuracy and also ensuring the safety of the eyes of the user. In general, as the distance increases, the light emission power also increases; and as the distance decreases, the light emission power also decreases. A corresponding relationship between a distance and the light emission power may be as follows. (1) The distance is a value, the light emission power is also a value, and the distance corresponds to the light emission power one to one. (2) The distance is a range, the light emission power is a value, and the distance corresponds to the light emission power one to one. The correspondences between the distance and the light emission power may be obtained by calibration with numerous preliminary experiments, and the calibrated correspondence is stored in the memory 600. When the structured light projector 100 works, the processor 300 determines, based on the calculated distance, the light emission power corresponding to the calculated distance according to the correspondences stored in the memory 600 and controls the structured light projector 100 to emit the light at the light emission power.

When the depth camera 400 is the front camera, if the distance between the face and the structured light projector 100 is greater than the first preset distance, it is considered that the user is not using the structured light projector 100, and the processor 300 may directly turn off the structured light projector 100 to reduce the power consumption of the electronic device 800.

Figure 13:
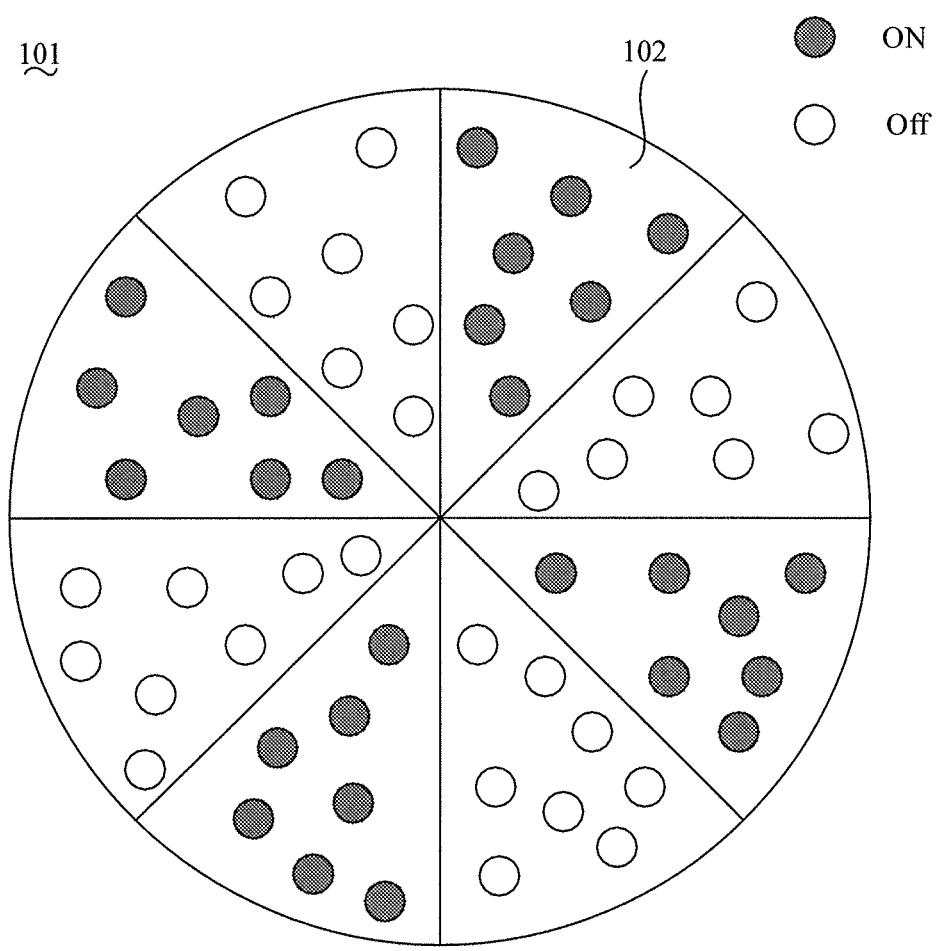
FIG. 13 illustrates a schematic diagram of light source partitions of a structured light projector according to some embodiments of the present disclosure.

As illustrated in FIG. 3 and FIG. 13, in some embodiments, a light source 101 of the structured light projector 100 may be divided into multiple light emission regions 102, and each light emission region 102 may include multiple light emission devices. The light emission devices in each of the multiple light emission regions can be independently controlled with respect to light emission devices in other light emission regions. When the distance between the face and the structured light projector 100 is greater than the second preset distance and less than the first preset distance, the processor 300, besides adjusting the driving current of the structured light projector 100 to enable the structured light projector 100 to emit the light at the target light emission power, may further control the light source 101 to turn on light emission devices in a number of light emission regions 102 determined based on the distance to enable the structured light projector 100 to emit the light at the target light emission power. For example, when the distance is 10 centimeters, light emission devices in two light emission regions 102 of the light source 101 are turned on. When the distance is 20 centimeters, light emission devices in four light emission regions 102 of the light source 101 are turned on. Herein, a shape of the light emission region 102 may be a sector (as illustrated in FIG. 13), a ring, a hollow square and the like, and is not limited herein.

As illustrated in FIG. 13, when not all of the light emission regions 102 are turned on, the turned-on light emission regions 102 in which the light emission devices has been turned on are distributed centrosymmetrically around a center point of the light source 101 (as illustrated in FIG. 13), so that brightness uniformity of the laser emitted by the structured light projector 100 may be improved, and the depth data acquisition accuracy may be improved.

In the descriptions of the specification, the descriptions made with reference to terms "an embodiment", "some embodiments", "example", "specific example", "some examples" or the like refer to that specific features, structures, materials or characteristics described in combination with the embodiment or the example are included in at least one embodiment or example of the present disclosure. In the specification, these terms are not always schematically expressed for the same embodiment or example. Moreover, the specific described features, structures, materials or characteristics may be combined in a proper manner in any one or more embodiments or examples. In addition, those skilled in the art may integrate and combine different embodiments or examples described in the specification and features of different embodiments or examples without conflicts.

In addition, terms "first" and "second" are only adopted for description and should not be understood to indicate or imply relative importance or implicitly indicate the number of indicated technical features. Therefore, features defined by "first" and "second" may explicitly or implicitly indicate inclusion of at least one such feature. In the descriptions of the present disclosure, "multiple" means at least two, for example, two and three, unless otherwise limited definitely and specifically.

Any process or method in the flowcharts or described herein in another manner may be understood to represent a module, segment or part including codes of one or more executable instructions configured to realize specific logic functions or operations of the process and, moreover, the scope of the preferred implementation mode of the present disclosure includes other implementation, not in a sequence shown or discussed herein, including execution of the functions basically simultaneously or in an opposite sequence according to the involved functions. This should be understood by those skilled in the art of the embodiments of the present disclosure.

Logics and/or operations represented in the flowcharts or described herein in another manner, for example, may be considered as a fixed sequence list of executable instructions configured to realize the logic functions and may specifically implemented in any computer-readable medium for an instruction execution system, device or equipment (for example, a computer-based system, a system including a processor or another system capable of reading instructions from the instruction execution system, device or equipment and executing the instructions) to use or for use in combination with the instruction execution system, device or equipment. For the specification, "computer-readable medium" may be any device capable of including, storing, communicating with, propagating or transmitting a program for the instruction execution system, device or equipment to use or for use in combination with the instruction execution system, device or equipment. A more specific example (non-exhaustive list) of the computer-readable medium includes: an electric connection portion (electronic device) with one or more wires, a portable computer disk (magnetic device), a Random Access Memory (RAM), a Read-Only Memory (ROM), an Erasable Programmable ROM (EPROM) (or flash memory), an optical fiber device and a portable Compact Disc Read-Only Memory (CD-ROM). In addition, the computer-readable medium may even be paper or another medium on which the program may be printed because, for example, the paper or the other medium may be optically scanned then edited, explained or, when necessary, processed in another proper manner to obtain the program in an electronic manner for storage in the computer memory.

It should be understood that each part of the present disclosure may be implemented by hardware, software, firmware or a combination thereof. In the abovementioned embodiments, multiple operations or methods may be implemented by software or firmware stored in a memory and executed by a proper instruction execution system. For example, in case of implementation with the hardware, like another implementation mode, any one or combination of the following technologies well-known in the art may be adopted for implementation: a discrete logic circuit with a logic gate circuit configured to realize a logic function for a data signal, an present disclosure-specific integrated circuit with a proper combined logic gate circuit, a Programmable Gate Array (PGA), a Field Programmable Gate Array (FPGA) and the like.

Those of ordinary skill in the art should understand that all or part of the operations in the method of the abovementioned embodiment may be completed through related hardware instructed by a program, the program may be stored in a computer-readable storage medium, and when the program is executed, one or combination of the operations of the method embodiment is included.

In addition, each functional unit in each embodiment of the present disclosure may be integrated into a processing module, each unit may also physically exist independently, and two or more than two units may also be integrated into a module. The integrated module may be implemented in a hardware form and may also be implemented in form of software functional module. When being implemented in form of software functional module and sold or used as an independent product, the integrated module may be stored in a computer-readable storage medium.

The storage medium may be a ROM, a magnetic disk, an optical disk or the like. The embodiments of the present disclosure have been shown or described above. However, it can be understood that the abovementioned embodiments are exemplary and should not be understood as limits to the present disclosure and those of ordinary skill in the art may make variations, modifications, replacements, transformations to the abovementioned embodiments within the scope of the present disclosure.

The invention claimed is:

1. A method for controlling a structured light projector, comprising:
    acquiring a depth image and an initial visible light image of a scene;
    determining whether a face exists in the initial visible light image;
    calculating, responsive to determining that the face exists in the initial visible light image, a distance between the face and the structured light projector based on the initial visible light image and the depth image; and
    adjusting light emission power of the structured light projector based on the distance.

2. The method of claim 1, wherein acquiring the depth image of the scene comprises:
    controlling the structured light projector to project a first laser pattern to the scene at an initial light emission power;
    acquiring a second laser pattern, wherein the second laser pattern is acquired by modulating the first laser pattern with the scene; and
    processing the second laser pattern to obtain the depth image.

3. The method of claim 1, wherein the initial visible light image has a first resolution, the depth image has a third resolution, and
    wherein calculating the distance between the face and the structured light projector based on the initial visible light image and the depth image comprises:
        converting the initial visible light image into an intermediate visible light image with a second resolution, wherein the first resolution is higher than the second resolution;
        recognizing a visible light face detection region from the intermediate visible light image;
        acquiring from the depth image, a depth face detection region corresponding to the visible light face detection region according to a mapping relationship between the intermediate visible light image and the depth image; and
        selecting depth data with a minimum value in the depth face detection region as the distance between the face and the structured light projector.

4. The method of claim 3, wherein acquiring from the depth image, the depth face detection region corresponding to the visible light face detection region according to the mapping relationship between the intermediate visible light image and the depth image comprises:
    calculating a ratio of the third resolution to the second resolution to obtain a mapping ratio;
    determining a second origin pixel in the depth image based on a coordinate value of a first origin pixel in the visible light face detection region and the mapping ratio;
    acquiring a second width and a second height of the depth face detection region based on a first width and a first height of the visible light face detection region and the mapping ratio; and
    acquiring the depth face detection region based on the second origin pixel, the second width, and the second height.

5. The method of claim 1, wherein adjusting the light emission power of the structured light projector based on the distance comprises:
    acquiring the light emission power of the structured light projector based on the distance when the distance is less than a first preset distance and greater than a second preset distance, wherein the second preset distance is less than the first preset distance;
    controlling the structured light projector to emit light at the light emission power; and
    controlling the structured light projector to be turned off when the distance is greater than the first preset distance or less than the second preset distance.

6. The method of claim 3, wherein the depth data with the minimum value comprises a distance between a point closest to the structured light projector in the face and the structured light projector.

7. A depth camera, comprising a structured light projector and a processor, wherein the processor is configured to:
    acquire a depth image and an initial visible light image of a scene;
    determine whether a face exists in the initial visible light image;
    calculate, responsive to determining that the face exists in the initial visible light image, a distance between the face and the structured light projector based on the initial visible light image and the depth image; and
    adjust light emission power of the structured light projector based on the distance.

8. The depth camera of claim 7, wherein the processor is further configured to:
    control the structured light projector to project a first laser pattern to the scene at an initial light emission power;
    acquire a second laser pattern, wherein the second laser pattern is acquired by modulating the first laser pattern with the scene; and
    process the second acquired laser pattern to obtain the depth image.

9. The depth camera of claim 7, wherein the initial visible light image has a first resolution, the depth image has a third resolution, and the processor is further configured to:

convert the initial visible light image into an intermediate visible light image with a second resolution, wherein the first resolution is higher than the second resolution;

recognize a visible light face detection region from the intermediate visible light image;

acquire from the depth image, a depth face detection region corresponding to the visible light face detection region according to a mapping relationship between the intermediate visible light image and the depth image; and select depth data with a minimum value in the depth face detection region as the distance between the face and the structured light projector.

10. The depth camera of claim 9, wherein the processor is further configured to:

calculate a ratio of the third resolution to the second resolution to obtain a mapping ratio;

determine a second origin pixel in the depth image based on a coordinate value of a first origin pixel in the visible light face detection region and the mapping ratio;

acquire a second width and a second height of the depth face detection region based on a first width and a first height of the visible light face detection region and the mapping ratio; and acquire the depth face detection region based on the second origin pixel, the second width, and the second height.

11. The depth camera of claim 7, wherein the processor is further configured to:

acquire the light emission power of the structured light projector based on the distance when the distance is less than a first preset distance and greater than a second preset distance, wherein the second preset distance is less than the first preset distance;

control the structured light projector to emit light at the light emission power; and control the structured light projector to be turned off when the distance is greater than the first preset distance or less than the second preset distance.

12. An electronic device, comprising:

a shell; and a depth camera, wherein the depth camera is arranged on the shell and the depth camera comprises a structured light projector and a processor, wherein the processor is configured to:

acquire a depth image and an initial visible light image of a scene;

determine whether a face exists in the initial visible light image;

calculate, responsive to determining that the face exists in the initial visible light image, a distance between the face and the structured light projector based on the initial visible light image and the depth image; and adjust light emission power of the structured light projector based on the distance.

13. The electronic device of claim 12, wherein the processor is further configured to:

control the structured light projector to project a first laser pattern to the scene at an initial light emission power;

acquire a second laser pattern, wherein the second laser pattern is acquired by modulating the first laser pattern with the scene; and process the second acquired laser pattern to obtain the depth image.

14. The electronic device of claim 12, wherein the initial visible light image has a first resolution, the depth image has a third resolution, and the processor is further configured to:

convert the initial visible light image into an intermediate visible light image with a second resolution, wherein the first resolution is higher than the second resolution;

recognize a visible light face detection region from the intermediate visible light image;

acquire from the depth image, a depth face detection region corresponding to the visible light face detection region according to a mapping relationship between the intermediate visible light image and the depth image; and select depth data with a minimum value in the depth face detection region as the distance between the face and the structured light projector.

15. The electronic device of claim 14, wherein the processor is further configured to:

calculate a ratio of the third resolution to the second resolution to obtain a mapping ratio;

determine a second origin pixel in the depth image based on a coordinate value of a first origin pixel in the visible light face detection region and the mapping ratio;

acquire a second width and a second height of the depth face detection region based on a first width and a first height of the visible light face detection region and the mapping ratio; and acquire the depth face detection region based on the second origin pixel, the second width, and the second height.

16. The electronic device of claim 12, wherein the processor is further configured to:

acquire the light emission power of the structured light projector based on the distance when the distance is less than a first preset distance and greater than a second preset distance, wherein the second preset distance is less than the first preset distance;

control the structured light projector to emit light at the light emission power; and control the structured light projector to be turned off when the distance is greater than the first preset distance or less than the second preset distance.

17. The electronic device of claim 12, wherein the shell is provided with an acquisition window, and the depth camera is aligned with the acquisition window to enable the depth camera to capture the depth image.

18. The electronic device of claim 12, wherein the shell comprises a movable bracket, and the depth camera is mounted on the movable bracket.

19. The electronic device of claim 16, wherein a light source of the structured light projector is divided into a plurality of light emission regions, each of the plurality of light emission regions comprises a plurality of light emission devices, and light emission devices in each of the plurality of light emission regions are independently controlled with respect to light emission devices in other light emission regions; and wherein in terms of controlling the structured light projector to emit light at the light emission power, the processor is configured to:

adjust a driving current of the structured light projector to enable the structured light projector to emit the light at the target light emission power; or determine a number of light emission regions in which light emission devices are to be turned on, and turn on the light emission devices in the light emission regions to enable the structured light projector to emit the light at the target light emission power.

20. The electronic device of claim 19, wherein the light emission regions in which the light emission devices has been turned on are distributed centrosymmetrically around a center point of the light source.

* * * * *

UNITED STATES PATENT AND TRADEMARK OFFICE
CERTIFICATE OF CORRECTION

Page 1 of 1

PATENT NO. : 10,880,539 B2
APPLICATION NO. : 16/534549
DATED : December 29, 2020
INVENTOR(S) : Xiaopeng Li It is certified that error appears in the above-identified patent and that said Letters Patent is hereby corrected as shown below:

On the Title Page

(71) Applicant reads:
"Guangdong (CN)"
Should read:
--Dongguan, Guangdong (CN)--

(73) Assignee reads:
"Guangdong (CN)"
Should read:
--Dongguan, Guangdong (CN)--

Signed and Sealed this
Ninth Day of March, 2021

Drew Hirshfeld
*Performing the Functions and Duties of the
Under Secretary of Commerce for Intellectual Property and
Director of the United States Patent and Trademark Office*